Figure 1:
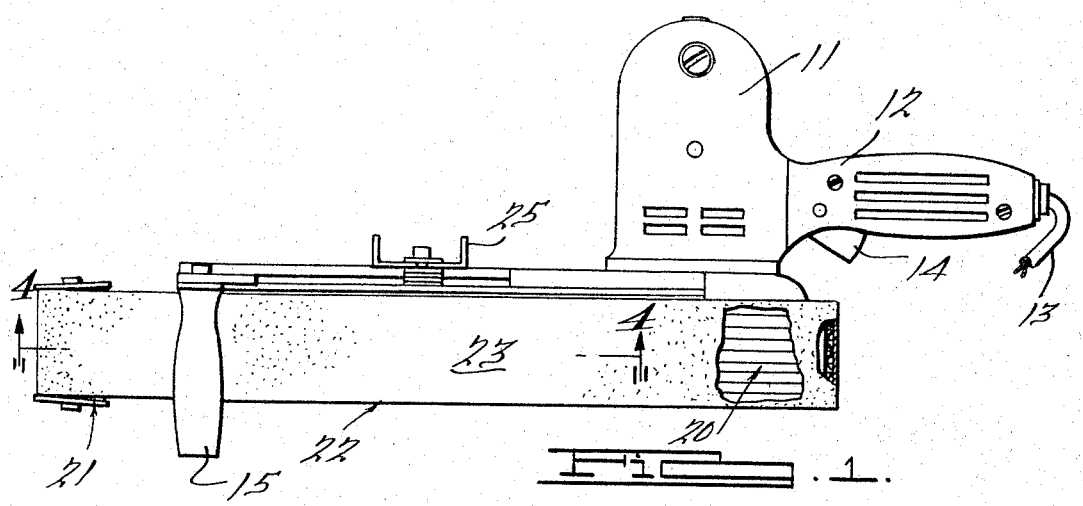

Aug. 8, 1967     T. J. LEVEQUE     3,334,447
SANDING MACHINE

Filed Sept. 28, 1965     4 Sheets-Sheet 1

INVENTOR.
Treffle J. Leveque
BY
Strauch, Nolan, Neale,
Nies & Bronaugh
ATTORNEYS.

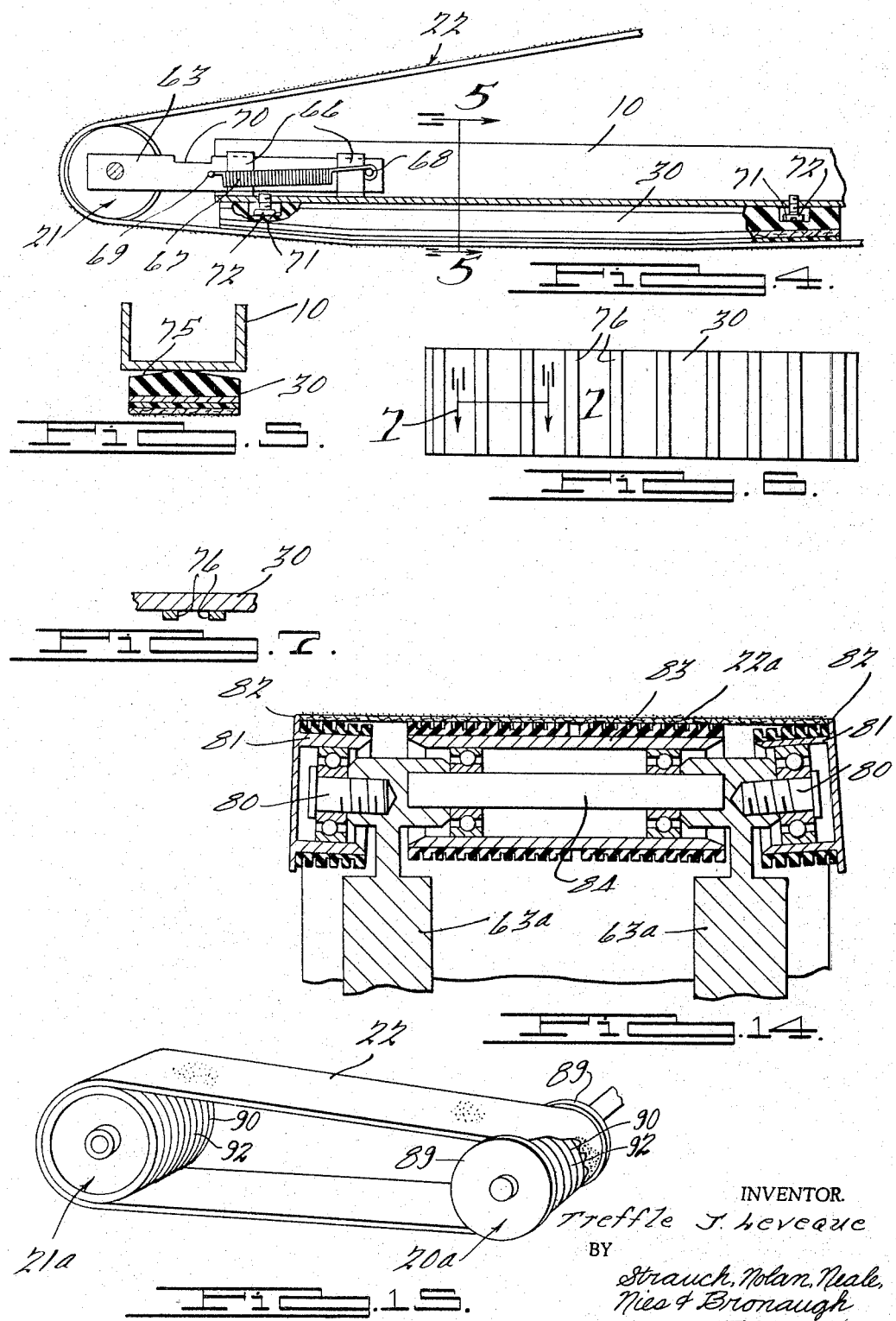

Aug. 8, 1967  T. J. LEVEQUE  3,334,447
SANDING MACHINE
Filed Sept. 28, 1965  4 Sheets-Sheet 3
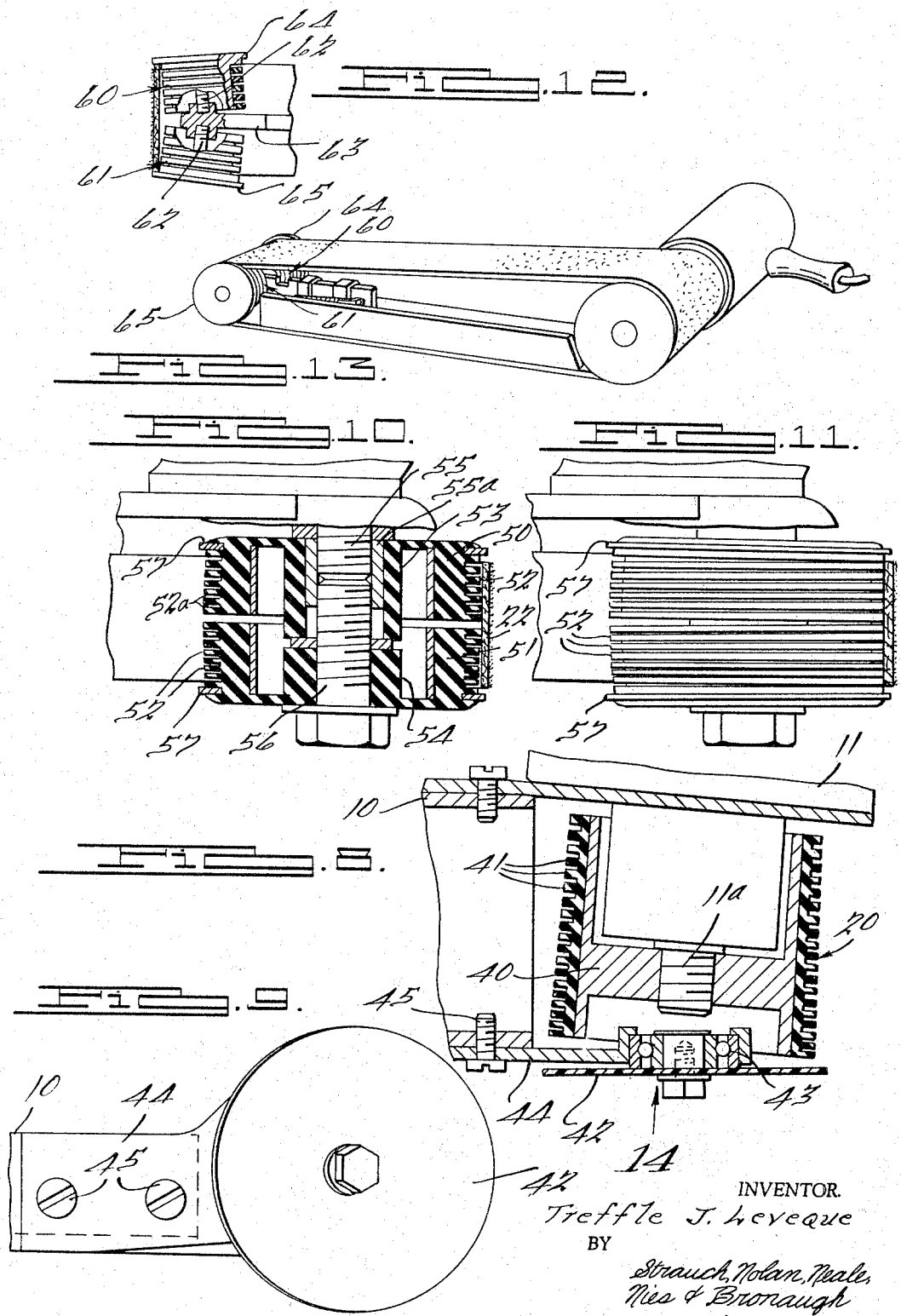
INVENTOR.
Treffle J. Leveque
BY
Strauch, Nolan, Neale,
Nies & Bronaugh
ATTORNEYS

INVENTOR
TREFFLE J. LEVEQUE

United States Patent Office 3,334,447
Patented Aug. 8, 1967

3,334,447
SANDING MACHINE
Treffle J. Leveque, 16606 Glastonbury,
Detroit, Mich. 48219
Filed Sept. 28, 1965, Ser. No. 490,971
28 Claims. (Cl. 51—141)

This application is a continuation-in-part of my copending application Ser. No. 278,613, filed May 7, 1963, for a Sanding Machine.

This invention relates to sanding machines and the like and, more particularly, to certain novel features thereof adapted to simplify, render more efficient, and improve generally, devices of this type.

One of the principal objects of the invention is to provide a surfacing-finishing machine of this type having a taut belt trained around a driving pulley and an idler pulley, either or both of which are provided with a flexible or floating peripheral surface or surfaces to keep the belt more tractable and to prevent the belt from being driven into the side flanges of the pulleys or from being driven laterally off the pulleys.

Experience has shown that forces tending to move the belt in a sideward or lateral direction may be produced by several factors inherent in the assembly of the machine and construction of parts aside from deliberately moving the belt transversely along the surface of a workpiece to be surface finished. Misalignment of driving and idler pulleys, for example, results in a force pattern which, if not compensated for, causes the belt to laterally creep or thread itself in the direction of increasing tightness of the belt. Also when the belt is longer on one side than on the other as a result of manufacturing imperfections and/or belt distortion by engagement with a back-up shoe or the workpiece, the belt will creep laterally in the direction of increasing tightness. To prevent the belt from threading itself along the pulleys, it has been proposed prior to this invention to employ resiliently ribbed or crowned pulleys for producing a force which opposes the forces applied to move the belt in a sideward direction for maintaining the belt tracking and centered on the pulleys. These prior proposals generally have been found to be unsatisfactory for keeping the belt centered and tracking for the large manufacturing tolerances encountered especially in mass produced, travelling belt sanding machines and the like. As a result, the belt is either driven off the pulleys or into engagement with pulley flanges with so much force that the belt edges are destroyed.

According to the present invention the pulley is formed with a series of radially outwardly extending, readily flexible ribs arranged circumferentially of the pulley and located in side-by-side spaced relation longitudinally of the pulley. When the belt attempts to ride sideways into engagement with the pulley flange or off the pulley, these ribs flex laterally while in engagement with the belt and are sufficiently flexible that they provide no appreciable reaction force that would cause the belt to creep as a result of pulley misalignment or belt imperfections or distortion. These ribs are sufficiently resilient, however, that they resume their radial position as they become disengaged from the belt. Therefore, these flexible ribs provide a floating surface which substantially eliminates the rib reactive action force tending to move the belt sideways into engagement with or over the pulley flanges.

By keeping the belt from severe frictional contact with the pulley flanges, this invention provides means for preventing damage to the edges of the belt and substantially reduces drag on the belt, thereby resulting in a higher belt speed from a given size of motor.

Still another object of the invention is to provide a device of this type in which the flanges of the pulley or pulleys are canted or inclined relative to one another, the flanges being further apart adjacent the front of the pulley at the area where the belt first engages the pulley. This eliminates contact between the belt and flanges at the point at which the flanges and belt are moving in different directions and at different speeds. This eliminates wear on the belt edges and hence results in longer belt life. At the rear of the pulley the belt and flanges are moving in the same direction and at the same speed so that there is little possibility of abrasive wear on the belt edge.

The canting of the pulley flanges may be accomplished either by a two-part pulley having means for flexibly mounting the pulley parts so that they flex into canted position when the belt is tightened or by providing two pulley parts mounted on fixed inclined axes. In either case, the advantages heretofore mentioned are achieved.

Figure 2:
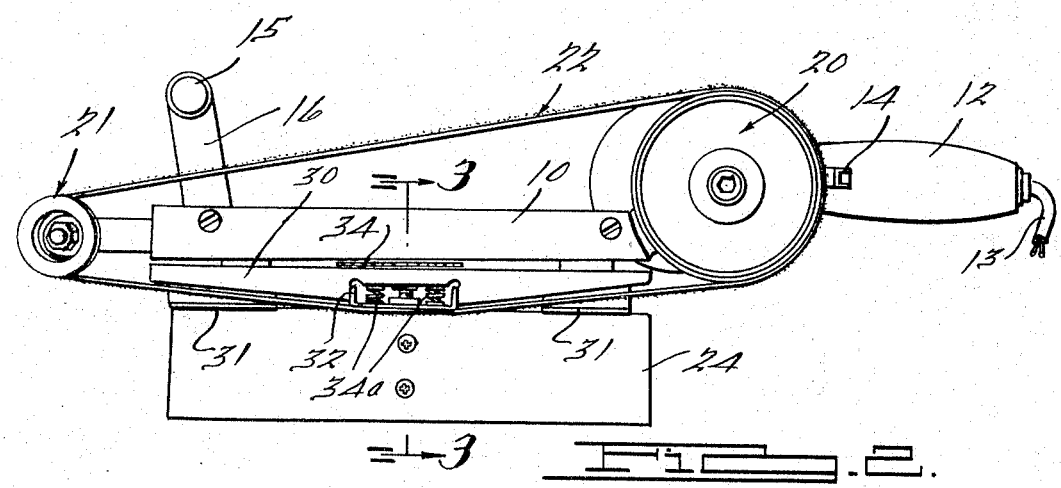
Figure 3:
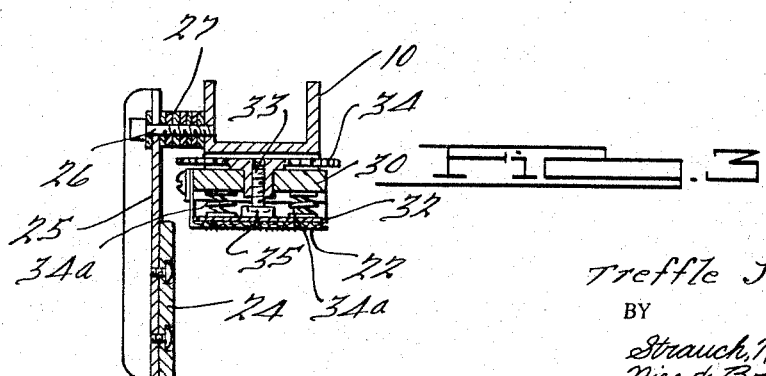
Figure 10A:
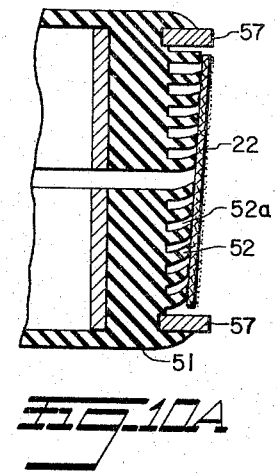
Figure 1B:
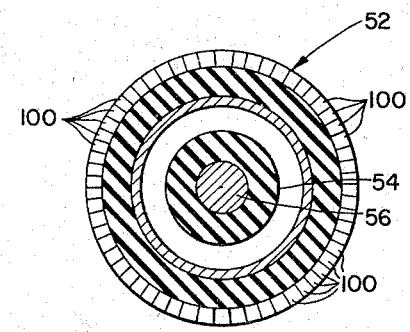

The various objects and advantages, and the novel details of construction of several commercially practical embodiments of the invention, will become more apparent as this description proceeds, especially when considered in connection with the accompanying drawings, in which:

FIGURE 1 is a top plan view of a sanding machine constructed in accordance with this invention;
FIGURE 2 is a side elevational view thereof;
FIGURE 3 is a detail sectional view taken substantially on the plane indicated by line 3—3 in FIGURE 2;
FIGURE 4 is a fragmentary longitudinal sectional view taken substantially on the plane indicated by line 4—4 in FIGURE 1;
FIGURE 5 is a detail section taken on line 5—5 in FIGURE 4;
FIGURE 6 is a plan view of a modified form of backing plate or shoe;
FIGURE 7 is a fragmentary sectional view taken on line 7—7 in FIGURE 6;
FIGURE 8 is an enlarged sectional elevational view of one form of driving pulley employed in the device;
FIGURE 9 is a fragmentary elevational view of the bottom end of FIGURE 8;
FIGURE 10 is an enlarged sectional elevational view of another form of pulley in which the pulley parts are flexibly mounted but in which the belt has not been tightened;
FIGURE 10A is an enlarged fragmentary section of the pulley similar to FIGURE 10, but showing the rib positions when the outboard side of the belt is tighter than the inboard side thereof;
FIGURE 11 is a similar view with the belt tightened and the pulley flanges moved into canted position;
FIGURE 12 is a sectional elevational view of a pulley comprising two pulley parts mounted on fixed inclined axes;
FIGURE 13 is a perspective view similar to FIGURE 1 showing an idler pulley as illustrated in FIGURE 12;
FIGURE 14 is a sectional view through a modified form of pulley particularly adapted for wide belts;
FIGURE 15 is a fragmentary perspective view showing a construction in which the pulley flanges are on the driving pulley and have been omitted from the idler pulley, and
FIGURE 16 is a transverse section illustrating a modified rib construction for the various ribbed pulley embodiments shown herein.

While the present invention is described in connection with a sanding machine, it will be apparent that the pulleys used in the device, which are provided with a flexible or floating surface, may be employed in connection with other types of constructions involving a pulley and belt arrangement.

In the form of construction shown best in FIGURES 1, 2 and 3, the device comprises a main frame 10 which is substantially U-shaped in cross section, as illustrated in FIGURE 3.

At one end of this frame, there is attached a driving motor 11, usually an electrical one, to which is attached the main handle 12 of the device. The cord 13 for supplying electric current to the motor 11 may pass through the handle and a switch 14 is provided for turning the electric current on and off. A second handle 15 is attached to the frame 10 by means of an upwardly extending bracket 16, and in manipulating the sander, the device is grasped by the hands of the operator by means of the handles 12 and 15.

The reference character 20 indicates a driving pulley and 21 indicates an idler pulley around which a belt 22 is adapted to travel. The belt 22 may be made of any suitable material and is provided with an abrasive surface 23.

If desired, the frame 10 may be provided with a combined guard and guide 24 secured thereto by means of a bracket 25 secured to the frame member 10 by means of a bolt 26, a spacer 27 being interposed between the bracket 25 and frame member 10 to properly locate the guard and guide 24.

The reference character 30 indicates a backing plate, or platen or shoe adapted to be interposed between the frame member 10 and the lower flight of the belt 22, as shown best in FIGURES 2 and 3. This backing plate or shoe is tapered from the center outwardly towards the ends thereof, as shown, and is adapted to support the lower flight of the belt when it is pressed against the workpiece. In the embodiment shown in FIGURES 2 and 3, means is provided to displace a portion of the flight of the belt out of its normal plane thereof so as to localize the pressure applied by the belt to the central portion of the lower flight thereof.

In this form of construction, the backing plate or shoe 30 is provided with a pair of spaced flat plates 31 which engage the workpiece on opposite sides of the central portion of the lower flight of the belt. The central portion of the belt is displaced out of the normal plane thereof by means of an adjustable member 32 adapted to be adjusted away from and toward the backing plate 30 by means of a screw 33 and an adjusting wheel 34. The screw 33 is non-rotatably connected to the adjustable member 32 by means of a connection 35 so that when the adjusting wheel 34 is rotated, the screw portion 33 will be screwed out of or into the adjusting wheel 34 to move the adjusting member 32 and thus displace the lower flight of the belt 22 with respect to its normal plane. Springs 34a are preferably inserted between the backing plate 30 and the member 32. Thus, as seen from FIGURE 2, the central portion of the lower flight of the belt 22 may be displaced outwardly to localize the pressure of the belt at its center portion, with the plates 31 resting on opposite sides of the displaced portion of the belt. Thus, extra pressure may be applied to the workpiece in a localized area.

One form of pulley 20, here shown as a driving pulley, is illustrated in FIGURES 8 and 9. In this form of construction, the pulley comprises a body or core 40 secured to the drive shaft 11a of the motor 11. The surface of the pulley 20 is provided with a series of radially outwardly extending flexible ribs 41 arranged circumferentially of the pulley and located in side-by-side spaced relation longitudinally of the pulley. The purpose of these flexible ribs is to provide the pulley with a flexible or floating surface which forms the operative surface of the pulley engageable by the belt 22. When the belt attempts to ride sideways into engagement with the pulley flange or to ride off the pulley, these ribs flex laterally while in engagement with the belt. When these ribs become disengaged from the belt (during the rotation of the pulley), they resume their normal radial position so as to again be ready to engage the belt during rotation of the pulley. This prevents the belt from being driven into the side flanges of the pulleys in a manner to be described in detail later on.

The ribs 41 may be formed of rubber or fiber or other suitable material, it being only essential that the ribs have sufficient stiffness to normally extend radially outwardly and sufficient flexibility to flex laterally as the belt tends to shift on the pulley.

In the embodiment shown in FIGURES 8 and 9, the pulley 20 tapers outwardly from its inner end to its outer end and at the outer end thereof there is disposed an end flange or disk member 42. This end flange or disk member is disposed adjacent the end of the pulley 20 and is rotatably mounted in bearings 43 carried by a bracket 44 secured by fastening bolts or the like 45 to the frame 10 of the device. The end flange or disk member 42 also acts as a guard and dust protector. In FIGURE 8, flange or disk member 42 is shown to be freely rotatable about an axis extending substantially at right angles to the normal direction of travel of the lower flight of belt 22. The rotational axis of shaft 11a is shown to be canted at an acute angle relative to the rotational axis of flange or disk member 42 such that the space between opposed surfaces on flange or disk member 42 and pulley 20 converges in the direction of travel of the lower, workpiece-engaging belt flight approaching pulley 20. It will also be seen from FIGURE 8 that the belt path passing around pulley 20 and delimited on opposite sides by opposing surfaces on flange or disk member 42 and frame 10 converges in the direction of travel of the lower belt flight approaching pulley 20. The foregoing pulley and flange or disk member construction avoids contact of the belt edges with the flange or disk member and frame surfaces at regions where the belt first engages with and finally departs from pulley 20 to reduce wear of the belt edges. If the edge of belt 22 does engage flange or disk member 42 as the belt passes around pulley 20, flange or disk member 42 will tend to move at the same speed as belt 22 since it is rotatable independently of pulley 20 with the result that wear of the belt edges will further be reduced.

In FIGURES 10 and 11, another form of pulley is illustrated. In this form of construction, the pulley consists of two pulley parts 50 and 51, the outer peripheries of which are provided with a plurality of radially extending flexible ribs 52, similar to the ribs 41 described in connection with the structure shown in FIGURE 8. These pulley parts 50 and 51 are formed of rubber or other flexible material and the hub portions 53 and 54 thereof are formed of the same material. These hub portions 53 and 54 when aligned form a bore engaging a shaft formed by the stud 55 projecting from the device, surrounded by a threaded sleeve 55a and a screw stud 56 threaded into the sleeve 55a from the outside of the pulley and locking the parts together.

The outer surfaces of the pulley sections 50 and 51 are normally tapered outwardly slightly from the outside edges to the center to form a crown on the pulley parts before the belt 22 is tightened. Each pulley section may be provided with an end flange 57 which is preferably molded into the material of the pulley parts. When the belt 22 is tightened, as illustrated in FIGURE 11, the bight thereof moves the pulley parts together at the rear of the pulley because of the flexible mounting of the pulley parts. This moves the flanges 57 into an inclined or canted position with the front edges of these flanges further apart than the rear edges thereof. In other words, the flanges 57 at the front of the pulley are inclined outwardly away from one another and the flanges at the rear side of the pulley are inclined toward one another. This spacing of the flanges at the front of the pulley avoids contact between the flanges and the belt at the area where the belt first engages the pulley. The flanges which are inclined toward one another at the rear portion of the pulley provides a substantially V-shaped groove to hold the belt in place on the pulley, as will be apparent from FIGURE 11.

In FIGURE 12, the inclination of the pulley flanges may be accomplished by providing the pulley parts 60 and 61 with separate shafts 62 which are mounted in a bracket 63 at an angle to one another so that the end flanges 64 and 65 on the pulley parts 60 and 61 are canted or inclined outwardly at the front of the pulley or, in other words, at the area where the belt first engages the pulley, and are inclined towards one another at the rear of the pulley to provide a substantially V-shaped groove to hold the belt in place on the pulley.

The bracket 63 just referred to comprises part of the means for tightening the belt on the pulleys. As shown in FIGURE 4, this bracket 63 slidably passes through spaced guide members 66 and is urged to the left to tighten the belt by means of one or more springs 67, one end of each of which is connected as at 68 to the bracket member 63, and the other end 69 is connected to the frame member 10. When it is desired to release the belt to remove the same, the bracket 63 and idler pulley 21 are forcibly moved to the right to engage a notch 70 in the bracket member 63 with the adjacent guide 66. This will hold the bracket 63 in its retracted position against the action of the spring 67 to permit the belt to be removed and repaired or another belt applied.

The backing plate or shoe 30 is removably secured in place by means of apertures 71 engaging studs 72 depending from the base of the main frame member 10; see FIGURE 4.

The backing plate or shoe 30 shown in FIGURES 4 and 5 is provided with a substantially V-shaped upper surface 75 so as to rockably support the shoe 30 on the bottom of the frame member 10, the shape of the upper face of the shoe member 30 permitting lateral rocking movement of the shoe and, consequently, of the belt 22 about an axis extending transversely of the drive and idler pulley axes and essentially parallel to the direction of travel of the lower belt flight so as to keep the belt in contact with the workpiece, even though the sanding device is not held exactly perpendicular thereto. The V-shaped upper surface 75 is shown in FIGURE 5 to be defined by a layer of resilient material mounted on the back of the belt-engaging shoe platen whereas the rigid frame surface engaged by surface 75 is flat to provide a resilient, cushioned rocking movement of shoe 30 about an axis defined by the longitudinally extending interface between surface 75 and frame 10, thus enabling shoe 30 and the engaged, lower belt run to effectively float for following the contour of a workpiece while maintaining the desired support of the lower belt flight engaging the workpiece. This backing shoe construction thus improves the quality of the finish on workpiece surfaces.

In FIGURES 6 and 7, the shoe 30 is shown provided with a plurality of transversely extending ribs or ridges 76 adapted to displace spaced portions of the lower flight of the belt as it passes over the workpiece. This will cause the belt to rapidly impinge against the workpiece to remove difficult deformations in the workpiece.

In FIGURE 14, a construction is shown which is adaptable for use with a wide belt 22a. In this form of construction, two bracket members 63a are employed similar to the bracket member 63. Each bracket member 63a carries a stud shaft 80 adapted to rotatably mount a pulley section 81. The stud shafts 80 are arranged at an angle to one another, the same as the shafts 62 of the construction shown in FIGURE 12. This arranges the flanges 82 of these pulley parts canted or at an angle, in the same manner as previously described. The center section of the belt 22a is carried by a straight pulley section 83 rotatably mounted on a shaft 84 also carried by the ends of the brackets 63a.

In the form of construction illustrated in FIGURE 13, the idler pulleys 60 and 61 are provided with a flexible or floating surface, as previously described, and are provided with the flanges 64 and 65; whereas, the drive pulley need not be provided with flanges unless the same are desired.

In the form of construction illustarted in FIGURE 15, the drive pulley 20a is provided with end flanges 89; whereas, the idler pulley 21a is not provided with end flanges. In this form of construction, the surface of the idler pulley 21a may be provided with flexible radially extending ribs, similar to the ribs 41 previously described. As will be apparent from the description thus far, either or both of the pulleys is provided with a flexible or floating peripheral surface and either or both of the pulleys can be provided with one or more end flanges.

As shown in FIGURES 10, 10A, and 11, circumferential, radially outwardly opening, flat-sided, grooves 52a are formed in the cylindrical, elastomeric pulley body to form ribs 52 which extend radially and which are normally contained in parallel, uniformly spaced apart planes extending at right angles to the pulley rotational axis. Preferably, the depths of grooves 52a, as best shown in FIGURE 10, are uniformly appreciably greater than the axial thickness or width of ribs 52. The axial spacing between ribs 52 is made sufficiently large that one rib does not objectionably interfere with the other when flexed for a purpose to be described in detail shortly. This pulley tread construction, in addition to providing a wide belt support surface area, enables ribs 52 to easily be flexed laterally by lateral displacement of belt 22 towards one or the other of flanges 57 which extend radially beyond ribs 52.

In FIGURE 10A, belt 22 is shown to be canted relative to the pulley axis in a tangential plane intersecting the upper and lower belt flights at essentially right angles. Thus ribs 52 are flexed with progressively increasing flexure extending from the inboard edge to the outboard edge of belt 22. This condition occurs, for example, if belt 22 is made longer on its inboard side adjacent to motor 11 or if either the idler or driving pulleys are canted out of parallelism with respect to the other. Thus, in the position of parts shown in FIGURE 10A, the outboard side of belt 22 is tighter than the inboard side adjacent to motor 11. Unless this condition is compensated for, belt 22 will creep sideways towards the outer pulley flange 57.

According to fundamental laws of physics, it will be appreciated that the action force for moving belt 22 laterally toward either of the flanges 57 must have an equal and opposite reaction force. The reaction force in this embodiment must be supplied by ribs 52. An example will serve to clarify the meaning of this concept: If a book presses downward on a table with an action force of two pounds, then the table presses upward on the book with a reaction force of two pounds. If, however, the table collapses when downward, the book force exceeds one pound, then the action force is limited to one pound regardless of the effort applied in pressing the book downwardly.

The present invention utilizes this concept to substantially eliminate the action force tending to move belt 22 sideways by making ribs 52 so flexible that they exert a negligible reaction force. By making the reaction force at ribs 52 negligible, then the action force also cannot exceed a negligible magnitude. Hence, the present invention instead of utilizing an opposing force to keep belt 22 centered, substantially eliminates the action force tending to move the belt sideways by reducing the reaction force at ribs 52 to a negligible magnitude. As a result, inherent imperfections in the manufacture of the sanding machine or belt or belt distortion is not effective to move belt 22 sideways into engagement with flanges 57. The only other force capable of driving belt 22 sideways is produced by moving belt 22 transversely along the surface of a workpiece. This force under normal conditions, however, is not great enough to cause damage to belt 22 by engagement of the belt with flanges 57.

The needed flexibility of ribs 52 is obtained by making grooves 52a sufficienty deep relative to the thickness of ribs 52. Ribs 52 are formed with sufficient resiliency, however, that they resume their original radial positions upon disengagement from belt 22.

By making ribs 52 with rubber or like elastomeric material, it will be appreciated that ribs 52, when unflexed, are sufficiently rigid in a radial direction so that they do not collapse towards the pulley axis under normal belt tension and workpiece engagement. This is required to provide a firm support for belt 22 since the latter is pulled taut by spring 67 to maintain working engagement of the lower belt flight with a workpiece.

The rib and groove constructions of the pulleys in FIGURES 8, 9, 12, and 14 are preferably the same and perform in the same manner as the rib and groove construction just described for the pulley construction in FIGURES 10, 10A, and 11 to substantially eliminate the rib reaction force resulting forces tending to move belt 22 sideways.

Each of the pulleys 20a and 21a, shown in FIGURE 15, is preferably formed with a cylindrical, hub-mounted elastomeric body having circumferential, radially outwardly opening grooves 90 defining axially spaced apart, radially extending, belt-engaging, flexible ribs 92 contained in parallel planes normally intersecting the pulley rotational axis. The construction and relative dimensions of grooves 90 and ribs 92 are preferably the same as that just described for grooves 52a and 52 in the embodiment of FIGURES 10, 10A, and 11. Flanges 89 preferably are thinner than ribs 92 and have a greater diameter than ribs 92.

FIGURE 16 illustrates a modified pulley rib construction wherein each of the ribs 52 are radially slit to provide a multiplicity of independently flexible, radially extending rib portions 100 contained in a common plane which normally intersects the pulley rotational axis. With this rib construction, flexure of one of the portions 100 does not cause the adjacently disposed rib portions to be flexed.

From the foregoing, it will be apparent that there is provided simple but effective means for keeping a belt from being driven into the side of the end flanges of the pulleys. The device is simple and efficient and may be economically manufactured and assembled and maintained with facility.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A tool for surface finishing workpieces comprising:
    (a) a frame,
    (b) a pair of spaced rollers rotatably carried by said frame,
    (c) an endless, surface-finishing belt trained around said rollers,
    (d) a belt-engaging backing shoe carried by said frame for supporting the workpiece-engaging run of said belt between said rollers, and
    (e) coacting surface means on said frame and the side of said backing shoe facing away from said workpiece engaging run for enabling said shoe to be rocked about an axis extending transversely of the rotational axes of said rollers,
    (f) said coacting surface means comprising a crowned surface and a further surface separably abutting said crowned surface and being relatively flattened with respect to said crowned surface.

2. The tool defined in claim 1 wherein said coacting surface means extend substantially over the entire length of said backing shoe.

3. The tool defined in claim 1 wherein said crowned surface is formed on said backing shoe and wherein said further surface is formed on said frame.

4. The tool defined in claim 3 wherein said further surface is flat and wherein said crowned surface longitudinally extends substantially the entire length of said backing plate.

5. The tool defined in claim 3 wherein said further surface is rigid and wherein said crowned surface is resilient.

6. The tool defined in claim 1 wherein said crowned surface is formed by a resilient layer of material on said backing shoe and is V-shaped having its apex butting against said further surface.

7. The tool defined in claim 1 comprising means independent of said coacting surface means for removably mounting said backing shoe on said frame.

8. The tool defined in claim 1 comprising means rendering the assembly of said rollers, frame, belt, and backing shoe bodily, portably manipulatable.

9. The tool defined in claim 8 comprising motor means mounted on said frame, and means drive connecting said motor means to one of said rollers.

10. The tool defined in claim 9 wherein the other of said rollers comprises a pair of separately formed axially adjacent sections, said frame having a portion extending between opposing ends of said sections, and means on said portion for rotatably supporting said sections.

11. The tool defined in claim 10 wherein said sections are rotatable about mutually canted axes to define a V-shaped channel receiving the approaching flight of said belt.

12. The tool defined in claim 9 wherein the other of said rollers is formed with a pair of separately formed, axially spaced apart end roller sections and a center roller section axially disposed between said end sections, said frame having end portions extending axially between each axially adjacent pair of roller sections and means on each end portion for rotatably supporting each adjacent pair of roller sections.

13. The tool defined in claim 12 wherein said end sections are canted outwardly with respect to the direction of travel of said workpiece engaging belt run along rotational axes intersecting the rotational axis of said center section at substantially equal, acute angles.

14. The tool defined in claim 9 comprising shaft means mounting said one roller and drive connected at one end to said motor means and a pulley flange freely rotatably mounted on said frame axially beyond said one roller for limiting lateral displacement of said belt, said one roller being canted relative to the rotational axis of said flange.

15. The tool defined in claim 14 comprising means on said one roller providing a multiplicity of closely axially spaced, peripheral, radially extending, flexible, belt engaging ribs.

16. A tool for surface finishing workpieces comprising:
    (a) a frame,
    (b) a pair of spaced pulleys rotatably carried by said frame,
    (c) an endless, surface-finishing belt trained around said pulleys,
    (d) one of said pulleys comprising a pair of axially spaced apart end rollers and a center roller axially disposed between said end rollers,
    (e) said frame having portions extending between axially adjacent ones of said end and center rollers,
    (f) and means on each frame portion for rotatably supporting said center and end rollers.

17. The tool defined in claim 16 comprising motor means mounted on said frame and drive connected to the other of said pulleys for imparting rotation thereto, said one pulley being an idler rotated by belt travel.

18. The tool defined in claim 17 wherein the rotational axis of said center roller extends substanitally at right angles to the direction of belt flight travel and wherein said end rollers are canted outwardly in the direction of travel of the workpiece engaging belt flight along axes intersecting the rotational axis of said center roller at substantially equal, acute angles.

19. The tool defined in claim 18 wherein said end rollers are provided adjacent opposite edges of said belt with pulley flanges and wherein each of said end and center rollers are provided with closely axially spaced, radially extending, peripheral, flexible ribs.

20. A tool for surface finishing workpieces comprising a frame, a pair of spaced pulley assemblies, an endless surface-finishing belt trained around said pulley assemblies, and motor means mounted on said frame, one of said pulley assemblies comprising:
 (a) rotatable shaft means drive connected to said motor means,
 (b) a belt engaging roller mounted on said shaft means,
 (c) a disk member disposed axially adjacent said roller,
 (d) and means freely rotatably mounting said disk member relative to said shaft means.

21. The tool defined in claim 20 wherein said disk member is rotatably mounted on said frame and wherein the said roller is canted relative to said disk member to define a space therewith that converges in the direction of travel of the belt flight approaching said roller.

22. The tool defined in claim 21 wherein said roller is tapered from its end adjacent said disk member toward its end opposite from said disk member.

23. The tool defined in claim 22 wherein said roller is formed with a multiplicity of closely axially spaced apart, radially extending, peripheral, flexible, belt-engaging ribs, said ribs being substantially radially rigid when unflexed and being sufficiently flexible to substantially eliminate any rib reaction force resulting from forces tending to displace said belt sideways.

24. A tool for surface finishing workpieces comprising:
 (a) a frame,
 (b) motor means mounted on said frame,
 (c) a rotatable drive pulley operably connected to said motor means,
 (d) an idler pulley rotatably mounted on said frame;
 (e) an endless, surface-finishing belt trained around said pulleys, and
 (f) belt engageable flanges on at least one of said pulleys for limiting sideward displacement of said belt as a result of relative transverse belt flight movement along a workpiece surface,
 (g) at least one of said pulleys comprising a roller formed with a multiplicity of axially spaced, radially extending, peripheral, flexible, belt-engaging ribs,
 (h) said ribs being contained in parallel planes normally intersecting the pulley rotational axis and being sufficiently flexible to substantially eliminate any rib reaction force resulting from forces tending to displace said belt sideways.

25. The tool defined in claim 24 wherein each of said pulleys is formed with a cylindrical, elastomeric, hub-mounted body having a series of circumferential, radially outwardly opening grooves defining said ribs, the width of said ribs being less than the depth of said grooves.

26. The tool defined in claim 24 comprising means for biasing said idler pulley to a position for pulling the opposed flights of said belt taut, and means for rendering the assembly of said frame, said motor means, said drive and idler pulleys, and said belt portably manually manipulatable.

27. The tool defined in claim 24 wherein each of said ribs is radially slit to provide a multiplicity of independently flexible, radially extending, belt-engaging rib portions.

28. The tool defined in claim 24 wherein said ribs are composed of such material that, when unflexed, they are substantially radially rigid to prevent their collapse toward the pulley axis under normal, radially applied belt tensioning forces.

References Cited

UNITED STATES PATENTS

| | | | |
|---|---|---|---|
| 677,333 | 7/1901 | Bartholomew | 74—240 |
| 1,419,049 | 6/1922 | Harsel et al. | 226—192 X |
| 1,493,779 | 5/1924 | Humphreys | 51—141 X |
| 2,199,069 | 4/1940 | Fowler | 51—141 |
| 2,423,407 | 7/1947 | Searles et al. | 74—240 X |
| 2,565,223 | 8/1951 | Gantzel | 51—148 |
| 2,586,848 | 2/1952 | Miller | 51—141 |
| 2,592,581 | 4/1952 | Lorig | 271—2.6 |
| 2,660,429 | 11/1953 | Lorig | 226—192 |
| 2,701,430 | 2/1955 | Lorig | 51—135 |
| 2,720,692 | 10/1955 | Lorig | 29—148.4 |
| 2,817,940 | 12/1957 | Lorig | 226—192 |
| 3,176,436 | 4/1965 | Anton | 51—170 |

FOREIGN PATENTS

| | | |
|---|---|---|
| 736,633 | 9/1955 | Great Britain. |

ROBERT C. RIORDON, *Primary Examiner.*

J. A. MATHEWS, *Assistant Examiner.*